US012327925B2

(12) United States Patent
Devitt et al.

(10) Patent No.: US 12,327,925 B2
(45) Date of Patent: Jun. 10, 2025

(54) PHASED CIRCULAR ARRAY OF PLANAR OMNIDIRECTIONAL RADIATING ELEMENTS

(71) Applicants: Connor Devitt, Boothbay, ME (US); Jayanti Venkataraman, Rochester, NY (US)

(72) Inventors: Connor Devitt, Boothbay, ME (US); Jayanti Venkataraman, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 412 days.

(21) Appl. No.: 17/981,277

(22) Filed: Nov. 4, 2022

(65) Prior Publication Data

US 2023/0142297 A1 May 11, 2023

Related U.S. Application Data

(60) Provisional application No. 63/276,336, filed on Nov. 5, 2021.

(51) Int. Cl.

*H01Q 3/36* (2006.01)
*H01P 3/00* (2006.01)

(Continued)

(52) U.S. Cl.

CPC ............... *H01Q 3/36* (2013.01); *H01P 3/003* (2013.01); *H01P 3/081* (2013.01); *H01P 5/10* (2013.01);

(Continued)

(58) Field of Classification Search

CPC . H01Q 3/36; H01Q 1/48; H01Q 9/065; H01P 3/003; H01P 3/081; H01P 5/10; H01P 11/003

See application file for complete search history.

(56) References Cited

U.S. PATENT DOCUMENTS

| | | | |
|---|---|---|---|
| 6,809,694 | B2 | 10/2004 | Webb et al. |
| 6,972,729 | B2 | 12/2005 | Wang |

(Continued)

FOREIGN PATENT DOCUMENTS

| | | | |
|---|---|---|---|
| GB | 2289798 | A | 11/1995 |
| JP | 56116008 | A | 9/1981 |
| WO | 20150040500 | A2 | 3/2015 |

OTHER PUBLICATIONS

Ahmed et al., "A 3D Printed 2x2 Circular Planar Antenna Array for Wireless Communications Applications," Journal of Nano and Electronic Physics 13(3):303028-1-30328-4 (2021).

(Continued)

*Primary Examiner* — William Kelleher
*Assistant Examiner* — Kenneth W Good
(74) *Attorney, Agent, or Firm* — Bond, Schoeneck & King, PLLC; Joseph M. Noto

(57) ABSTRACT

A phased circular array of antennas each having an omnidirectional radiation pattern are disposed on an outside surface of a planar sheet conformed to the shape of a cylinder. A plurality of coplanar waveguides includes a ground line and a signal line feeding the antennas is disposed on the outside surface of the cylinder. A signal-carrying feed network electromagnetically coupled to the coplanar waveguides is disposed on an inside surface of the cylinder which does not interfere with radiation from the antennas. An electrical ground is disposed on the outside surface of the cylinder which is connected to the ground feed of each of the coplanar waveguides and serves as a ground plane for the signal-carrying feed network. The array is configured to provide 360° beam steering around the vertical axis of the cylinder. A method of fabrication is disclosed.

8 Claims, 24 Drawing Sheets

(51) Int. Cl.

| | |
|---|---|
| ***H01P 3/08*** | (2006.01) |
| ***H01P 5/10*** | (2006.01) |
| ***H01P 11/00*** | (2006.01) |
| ***H01Q 1/48*** | (2006.01) |
| ***H01Q 9/06*** | (2006.01) |

(52) U.S. Cl.
CPC ............. *H01P 11/003* (2013.01); *H01Q 1/48* (2013.01); *H01Q 9/065* (2013.01)

(56) References Cited

U.S. PATENT DOCUMENTS

| | | | | |
|---|---|---|---|---|
| 7,414,567 | B2 | 8/2008 | Zhang et al. | |
| 10,056,700 | B2 | 8/2018 | Kim et al. | |
| 10,069,214 | B1 * | 9/2018 | Hooper ................ | H01Q 21/205 |
| 10,965,039 | B1 | 3/2021 | Chandler et al. | |
| 11,197,612 | B2 * | 12/2021 | Costantine ............. | H01Q 1/273 |
| 2002/0113743 | A1 * | 8/2002 | Judd .................... | H01Q 3/2611 343/757 |
| 2006/0009207 | A1 | 1/2006 | Chen et al. | |
| 2008/0316139 | A1 | 12/2008 | Blaser et al. | |
| 2010/0302126 | A1 | 12/2010 | Shtrom et al. | |
| 2012/0188137 | A1 * | 7/2012 | Lalezari ................. | H01Q 21/10 343/773 |
| 2014/0062823 | A1 | 3/2014 | Shor et al. | |
| 2015/0283392 | A1 | 10/2015 | Bourke, Jr. et al. | |
| 2015/0301168 | A1 | 10/2015 | Brown et al. | |
| 2015/0380815 | A1 | 12/2015 | Boutayeb et al. | |
| 2016/0172755 | A1 | 6/2016 | Chen et al. | |
| 2020/0295799 | A1 | 9/2020 | Howard | |
| 2022/0013904 | A1 | 1/2022 | Barabash | |
| 2022/0137310 | A1 | 5/2022 | Nair | |

OTHER PUBLICATIONS

Assimonis et al., "Millimeter-wave Multi-mode Circular Antenna Array for Uni-Cast Multi-Cast and OAM Communication," Scientific Reports, 11:4928 (2021).

Sanchez-Olivares et al., "Circularly Conformal Patch Array Antenna with Omnidirectional or Electronically Switched Directive Beam," IET Journals, 11(15):2253-2259 (2017).

Sharawi et al., "A Novel Printed Circular Antenna Array Based on V-shaped Elements," IEEE (2012).

International Search Report and Written Opinion for International Patent Application No. PCT/US22/49029 (mailed Apr. 6, 2023).

Zhu et al. "An improved broad-band microstrip-to-coplanar-waveguide (CPW) transition is developed on a basis of the frequency-dependence characteristic of an electromagnetic surface-to-surface coupling," IEEE 2023.

Han et al., "Compact dual-band dipole antenna fed by a coplanar waveguide" IEEE 2023.

* cited by examiner (a)

(b)

PHASED CIRCULAR ARRAY OF PLANAR OMNIDIRECTIONAL RADIATING ELEMENTS

CROSS REFERENCE

This application claims the benefit of the filing date of U.S. Provisional Patent Application Ser. No. 63/276,336, filed Nov. 5, 2021, which is hereby incorporated by reference in its entirety.

FIELD

Disclosed is a phased circular array of planar omnidirectional radiating antennas and method for fabrication.

BACKGROUND

Beam steering with circular arrays has been accomplished through a multitude of methods in the past. One common approach is to connect each individual antenna element or bank of elements in the circular array to a digital beam-forming network, beam switching network, or butler matrix such as was done in GB 2289798 A, JPS62169505A, US 2014/062823 A1, and US 2006/092075 A1. US 2014/062823 A1 places a number of highly directive Yagi-Uda or horn antennas in a circular array where each element is pointed in a distinct direction. A beam switching network is used to power a select subset of these elements to illuminate distinct regions in the plane of the array. This circular array can only be steered in a finite set of directions determined by the number of elements in the array. US 2006/092075 A1 employs a similar approach but instead of single Yagi-Uda or horn antennas, the disclosed structure places a multitude of antennas in a column and the columns are placed into a circular array. Using beam switching and beam forming networks, the array powers a select column of elements to illuminate different regions in the plane. A different approach from WO 2015/040500 A2 mechanically rotates a feed system which applies a fixed phase and magnitude excitation to stationary antenna elements placed in a circular array. As the feed system mechanically rotates, different subsets of antenna elements in the circular array are powered which achieves the beam steering.

The theory of beam steering with circular arrays has been well known for decades. Placing antennas elements into a circular array and demonstrating the beam steering in the azimuth plane is easy to do by exciting each element or bank of elements individually. The major challenge in implementing a circular array with 360° beam steering is in the design of a feed system to apply the required phase and magnitude excitation. Since the beam is steered in the plane of the array, the feed system must be carefully designed as to not disrupt or distort the combined radiation pattern of the antenna elements. Additionally, the electric field polarization of the feed system must match that of the antenna elements. Both the antennas and feed system must be designed in such a way that medium to large scale production of the array is possible.

SUMMARY

In accordance with an aspect of the present invention, there is provided a phased circular array of antennas, including:

- a planar two-sided substrate sheet conformed to the shape of a cylinder;

- a plurality of antennas disposed on an outside surface of the cylinder, each antenna of the plurality including paired ground and signal radiating elements having an omnidirectional radiation pattern;
- a plurality of coplanar waveguides disposed on the outside surface of the cylinder, each coplanar waveguide of the plurality including a ground line and a signal line and feeding one of the plurality of paired ground and signal radiating elements, wherein the ground of the radiating element is connected to the coplanar waveguide ground line and the signal of the radiating element is connected to the coplanar waveguide signal line;
- a signal-carrying feed network disposed on an inside surface of the cylinder electromagnetically coupled to the plurality of coplanar waveguides and which does not interfere with radiation from the antennas, wherein the inside surface of the cylinder opposite the plurality of paired ground and signal radiating elements is devoid of an electrical conductor; and
- an electrical ground disposed on the outside surface of the cylinder connected to the ground feed of each of the plurality of coplanar waveguides which serves as a ground plane for the signal-carrying feed network.

In accordance with another aspect of the present invention, there is provided a method for the fabrication of a phased circular array of antennas, including:

- printing a plurality of antennas on a first side of a planar two-sided substrate sheet;
- printing a plurality of coplanar waveguides on the first side of the planar two-sided substrate sheet, each coplanar waveguide of the plurality having a ground line and a signal line and feeding one of the plurality of the antennas;
- printing a signal-carrying feed network including a transmission line and a coupling structure to each signal line of the plurality of coplanar waveguides on a second side of the planar two-sided substrate sheet, wherein the second side of the planar two-sided substrate sheet opposite the plurality of antennas on the first side is devoid of an electrical conductor;
- printing an electrical ground on the first side of the planar two-sided substrate sheet connected to the ground line of each of the plurality of coplanar waveguides which serves as a ground plane for the signal-carrying feed network; and
- conforming the planar two-sided substrate sheet to the shape of a cylinder having the first side of the planar two-sided substrate sheet on the outside of the cylinder.

These and other aspects of the present disclosure will become apparent upon a review of the following detailed description and the claims appended thereto.

BRIEF DESCRIPTION OF THE DRAWINGS

FIG. 2B shows the etched copper features on the outside.

DETAILED DESCRIPTION

Figure 1A:
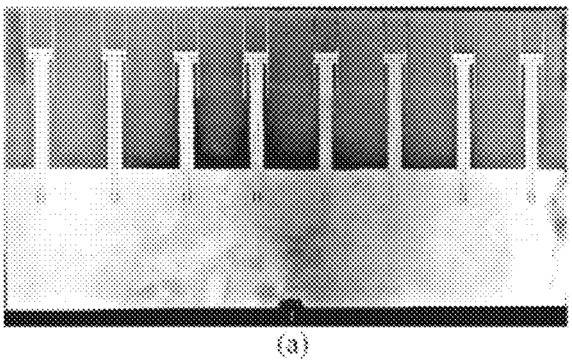
FIG. 1A shows a conformal array of dual dipoles on one side and FIG. 2B shows a microstrip transmission line corporate feed system on the other side.

Disclosed is an embodiment of a phased circular array of antennas on a planar two-sided substrate sheet conformed to the shape of a cylinder. A plurality of antennas is disposed on an outside surface of the cylinder. Each antenna includes paired ground and signal radiating elements having an omnidirectional radiation pattern. A plurality of coplanar waveguides is disposed on the outside surface of the cylinder. Each coplanar waveguide includes a ground line and a signal line feeding the paired ground and signal radiating elements. The ground of the radiating element is connected to the coplanar waveguide ground line and the signal of the radiating element is connected to the coplanar waveguide signal line. A signal-carrying feed network disposed on an inside surface of the cylinder is electromagnetically coupled to the plurality of coplanar waveguides and which does not interfere with radiation from the antennas. The inside surface of the cylinder opposite the plurality of paired ground and signal radiating elements is devoid of an electrical conductor. An electrical ground is disposed on the outside surface of the cylinder which is connected to the ground feed of each of the coplanar waveguides and serves as a ground plane for the signal-carrying feed network. The array is configured to provide 360° beam steering around the vertical axis of the cylinder.

Suitable paired ground and radiating elements for use in the present disclosure include dipoles, planar dipoles, zigzag dipoles, meandered dipoles, or other omnidirectional two wire antenna. Suitable ground and radiating element materials for use in the present disclosure include copper, silver plated copper, electroless Nickel electroless Palladium Immersion Gold (ENEPIG) plated copper, aluminum, or other metal with high conductivity.

A suitable substrate for use in the present disclosure includes a dielectric material, a lowloss dielectric material, such as Polytetrafluoroethylene (PTFE), FR4, Teflon, and the like. The substrate is capable of being conformed in a circle or cylinder. The substrate provides support for the printed planar radiating elements, minimizes any distortion in the radiation pattern of the elements, and ensures enough flexibility such that the planar circuitry may be wrapped into the cylindrical shape. The support is transparent to electromagnetic waves. The thickness of the planar sheet is less than the wavelength used so its impact on radiation is minimal.

An omnidirectional radiation pattern is defined as uniform radiation in one plane and a null in the orthogonal plane.

A suitable coplanar waveguide for use in the present disclosure includes a single transmission line disposed onto a dielectric substrate, together with a pair of ground conductors disposed on either side of the signal line that are held at the same potential. The structure is coplanar because all three conductors are disposed on the same side of the substrate.

A suitable feed system includes a power divider network constructed in either microstrip or stripline configuration. In an embodiment, a signal-carrying feed network includes a microstrip transmission line and a coupling patch configured to provide a transition from an orthogonal electric field configuration of the microstrip transmission line to the configuration of the coplanar waveguide. A corporate feed system has a single input port which divides power to a multitude of output ports. To steer the antenna array, a phase shifter may be used to power each dipole pair with an appropriate phase excitation such that 360° scanning can be achieved. The phase excitation can be achieved through path length delay of the microstrip feedline system. The same phase excitation can be achieved by electronic phase shifters incorporated into the microstrip transmission line feed system. The operating frequencies of this system can be changed by adjusting the lengths of the dipole antenna elements, and the array can be constructed with differing numbers of antennas, depending on the needs of specific applications. The signal-carrying feed network is disposed on an inside surface of the cylinder isolated from the signal radiating elements and therefore does not interfere with radiation from the antennas.

Figure 1B:
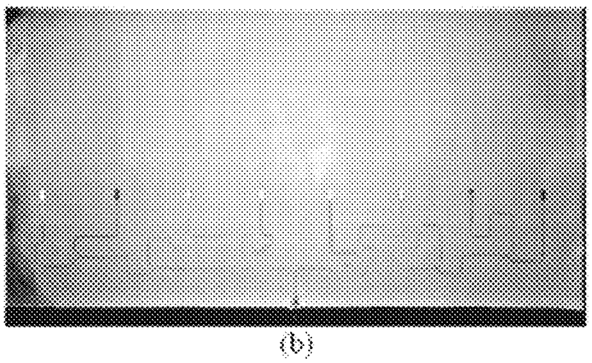

The conformal circular antenna array is capable of 360° beam steering in the azimuth plane constructed using planar circuitry. By virtue of being a conformal array, both the radiating elements and feed system may be printed on a single substrate. In an embodiment, the radiating elements can be printed on the outside surface of a thin dielectric sheet while the inside surface near the antenna elements is devoid of copper features. The feed system may be printed on the inside surface below the antenna elements. Both the array and feed system may be etched in a single fabrication step. FIGS. 1A and 1B are an example of a fabricated two-sided board, with the antennas on one side and the feed system on the other side which is then shaped into a cylindrical array.

FIGS. 1A and 1B show a fabricated two-sided thin planar dielectric sheet prior to shaping it into a circular array. FIG. 1A shows a conformal array of dual dipoles on one side and FIG. 1B shows a microstrip transmission line corporate feed system on the other side.

Once printed, the planar circuit can be wrapped into a cylindrical shape to form the circular array. FIGS. 2A-2D illustrate an embodiment of the circular array.

Figure 2A:
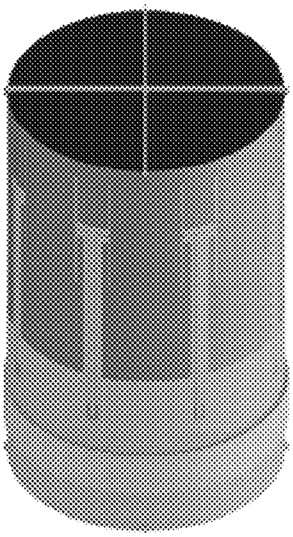
FIG. 2A shows a conformal circular array.
Figure 2B:
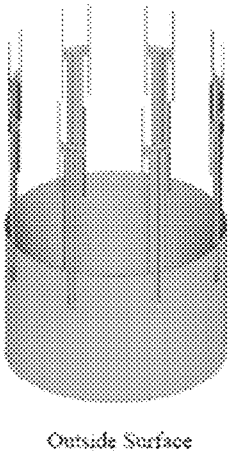
Figure 2C:
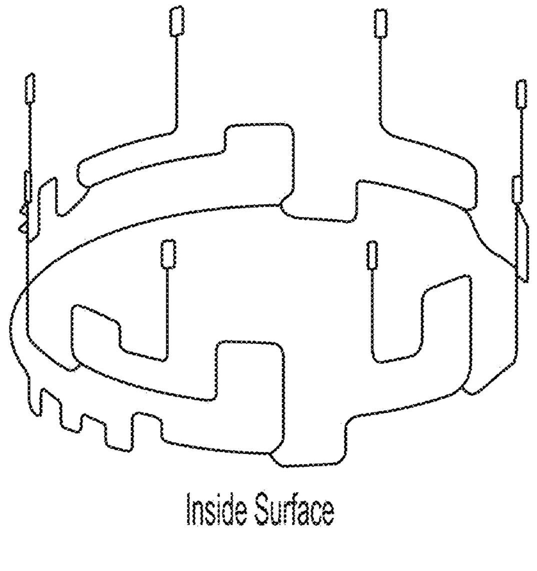
FIG. 2C shows the etched copper features on the inside and FIG. 2D shows the transition from the inside surface to the outside surface.
Figure 2D:
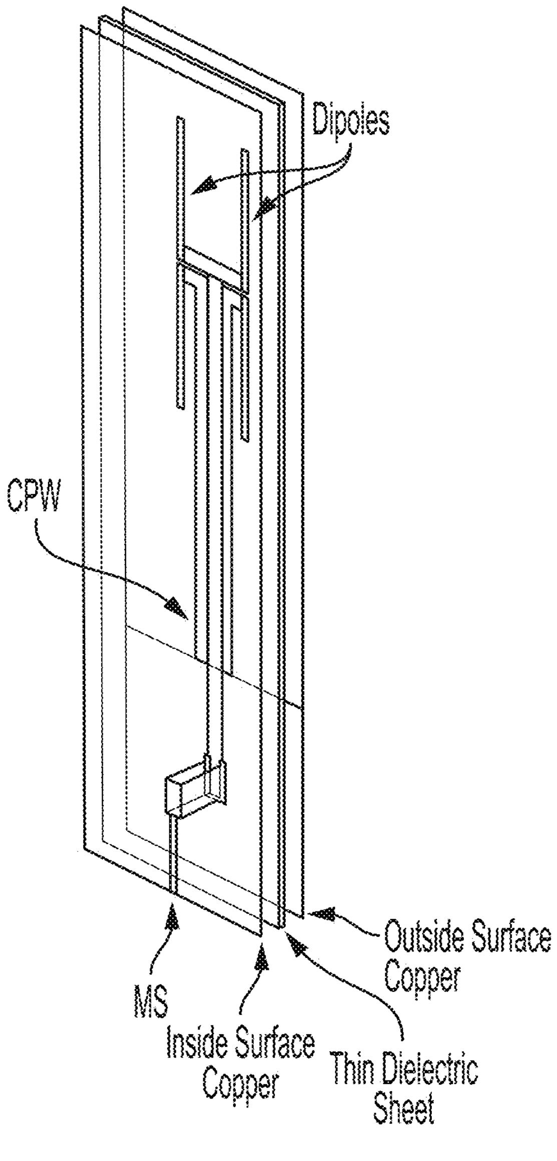

FIG. 2A shows an example of the conformal circular array. FIG. 2B shows the etched copper features on the outside and FIG. 2C shows the etched copper features on the inside surface of the dielectric sheet. FIG. 2D shows the transition from the microstrip feed network printed on the inside surface to the CPW printed on the outside surface.

A thin dielectric sheet provides support for the printed planar radiating elements, minimizes any distortion in the radiation pattern of the elements, and ensures enough flexibility such that the planar circuitry may be wrapped into the cylindrical shape. To steer in a 360° region, each radiating element has an omnidirectional radiation pattern from planar center-fed dipole antennas. A coplanar waveguide (CPW) is used to feed the dipole elements while the inside surface of the dielectric sheet is devoid of an electrically conductive material, such as copper. The CPW also has the added advantage that the electric field polarization is aligned to the polarization of the dipole antenna. If the CPW is used to feed a single dipole element, the required omnidirectional pattern of the dipole antenna would be severely distorted. Therefore, two dipole antennas are placed on either side of the CPW feed and the resulting structure is termed a “dual-dipole”.

Figure 3A:
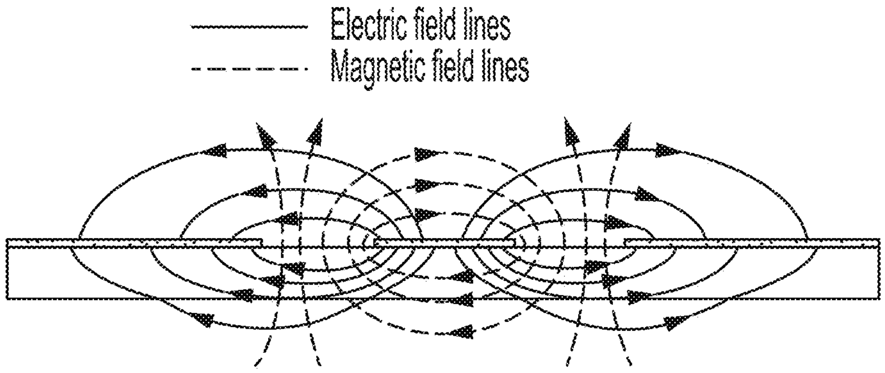
FIG. 3A is a cross-section of the substrate showing a portion of CPW on the outside surface of the substrate, 3B is a cross-section of the substrate showing the electric field lines of the signal from the microstrip transmission line on the inside surface of the substrate, and 3C is a cross-section of the two-sided substrate showing filed lines and EM coupling.
Figure 3B:
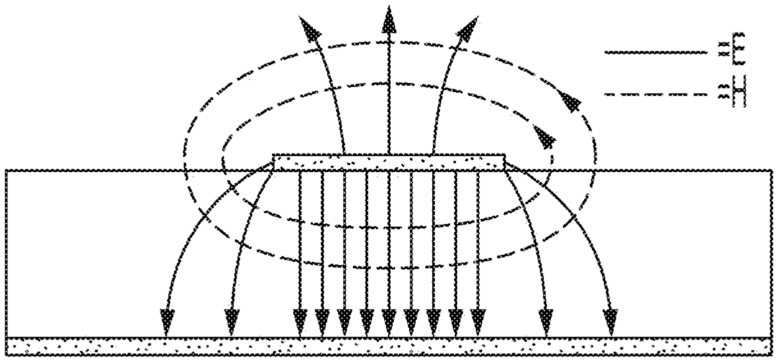
Figure 3C:
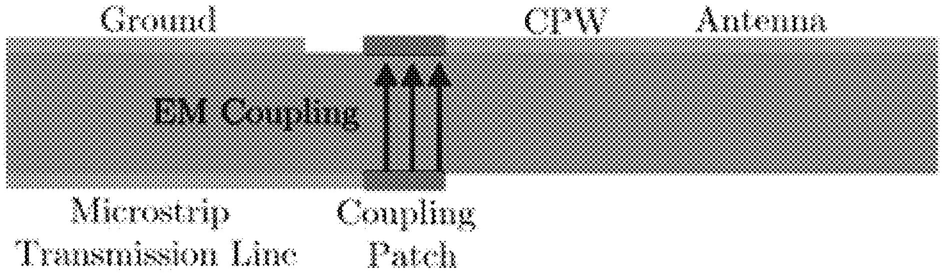
Figure 11:
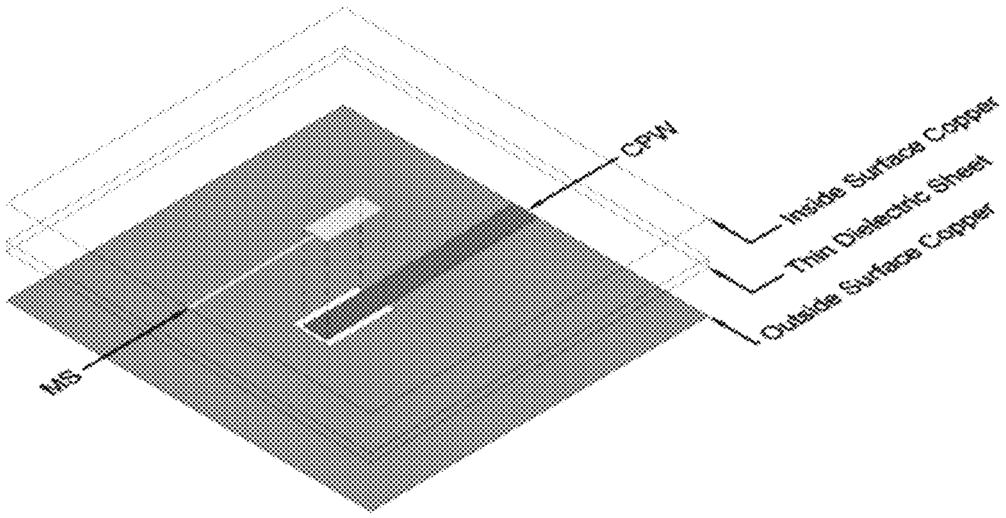
FIG. 11 shows a CPW to microstrip transition.
Figure 12:
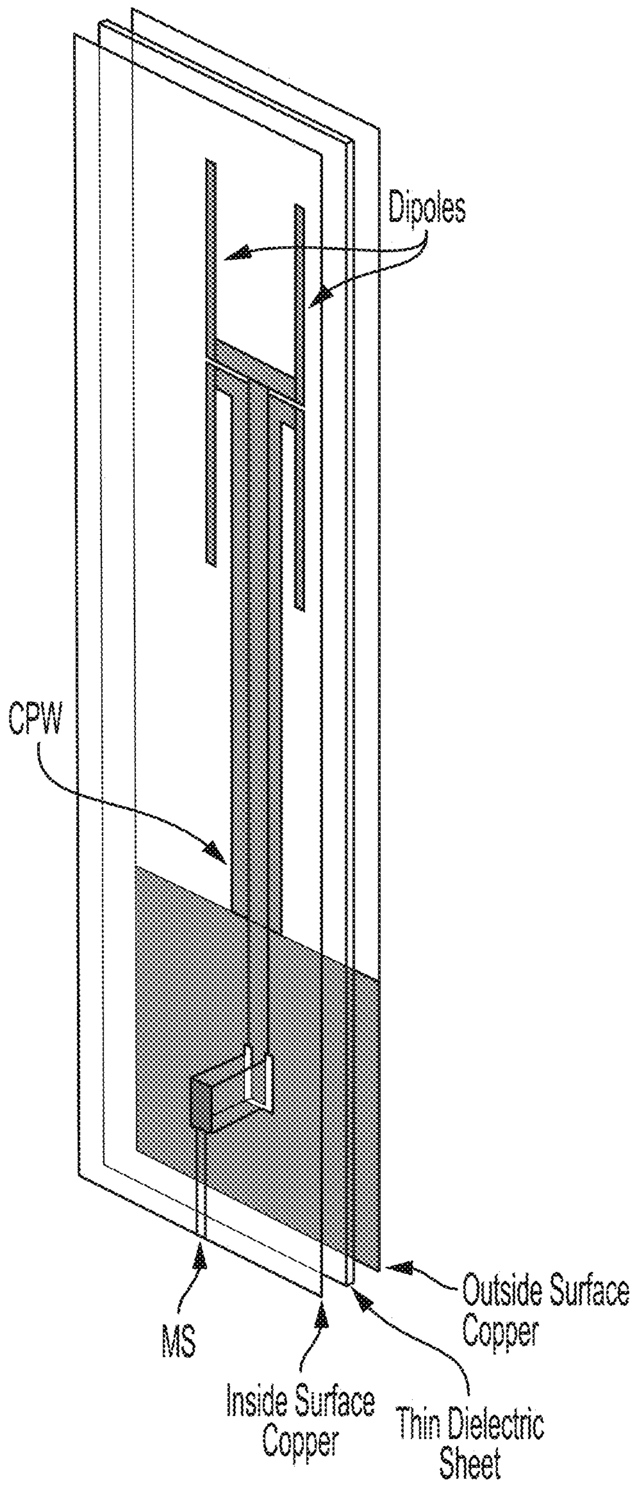
FIG. 12 shows the microstrip to CPW transition including a dual-dipole radiating element.

FIG. 3A is a cross-section of the substrate showing the CPW on the outside surface of the substrate. For the CPW as shown, the electric field lines are oriented from the center signal line to the two ground planes on either side of the signal line as shown in FIG. 3A. FIG. 3B is a cross-section of the substrate showing the electric field lines from the microstrip transmission line (signal line) on the inside surface of the substrate are directed from the signal line vertically to the ground plane on the opposite side of the substrate. To transform from the transmission line field configuration to the CPW field configuration, a coupling patch is used as also shown in FIGS. 11 and 12. This enables EM coupling from the microstrip transmission line to the CPW. The cross-section of this coupling phenomenon by the coupling patch is schematically shown in FIG. 3C. Near the coupling patch, the microstrip and CPW share the same ground plane as shown in FIG. 11. Strong coupling from the microstrip coupling patch to the CPW is achieved through their close proximity due to the thin substrate.

In an embodiment, the basic structure of this dual-dipole antenna is fed by CPW waveguide with a meandered structure to reduce the physical size of the lower frequency dipole. The two dipoles operate at the same frequency and they act as a small linear array which has a nearly omnidirectional pattern with minimal distortion from the CPW. Their combined radiation pattern is sufficiently omnidirectional to achieve the 360° beam steering. A phase excitation and uniform magnitude excitation is applied through the CPW feed to steer the main beam of the array in the azimuth plane. The circuit to apply this beam steering excitation is implemented using microstrip lines placed below the radiating elements. The microstrip transmission lines are printed on the inside surface of the conformal array and its ground plane is on the outside surface.

To steer the main beam, a uniform magnitude excitation and non-uniform phase excitation is required. The uniform magnitude excitation can be generated through a microstrip power divider network. The beam steering phase excitation may be generated passively or actively. With a passive excitation, the location of the beam cannot be adjusted, but an active phase excitation would allow the main beam to be steered dynamically. The phase excitation for the ($\alpha_n$) for the $n^{th}$ element in the N element circular array to steer the main beam in the ($\theta_0$, $\phi_0$) direction is given by eq. (1) where k is the angular wave number, a is the array radius, and $\phi_n$ is the angular location of the $n^{th}$ element.

$$\alpha_n = -ka \sin(\theta_0)\cos(\phi_0 - \phi_n) \tag{1}$$

This phase excitation can be generated passively by adjusting the transmission line path length to the output of the power divider network. Alternatively, a passive phase excitation can be generated using planar transmission line configurations of Schiffman phase shifters, quadrature hybrids, ring hybrids and hybrid couplers arranged in beam forming networks such as a Butler matrix or a Hadamard matrix. To dynamically steer the beam, electronic phase shifters may be inserted at each output port of the beam-forming network and controlled either through an analog voltage reference pin (for analog phase shifters) or a set of digital control pins (for digital phase shifters) to achieve a desired phase distribution for beam steering. The microstrip divider may be passively phased to steer the beam towards one radiating element and the electronic phase shifters used to further adjust the phase excitation to steer the beam towards any other direction in the azimuth plane. There are many commercially available surface mount electronic phase shifters at a variety of frequency ranges which accept either a digital or analog control input. The analog phase shifters are preferable as they offer a continuous range of phase delays which enables the main beam of this circular array to be steered towards any arbitrary direction in the plane. The commercially available digital phase shifters may also be used, but the beam may only be steered in a finite set of directions due to the limited set of phase delays available in these packages. In either case, the control input of the electronic phase shifter is set to match the set of phase excitations required to steer the beam towards ($\theta_0=90°$, $\phi_0$) from eq. (1).

In an embodiment, the output of the microstrip power divider network and phase shifters is connected to the CPW feeding each dual-dipole element. The electric field polarization of this microstrip feed system is orthogonal to the polarization of the CPW feeding each element, so a transition from CPW to microstrip is provided by a coupling structure. The transition takes advantage of the thin dielectric sheet to electromagnetically couple the CPW to the microstrip line. This transition shows good performance at the required operating frequency and on the thin dielectric sheet supporting the array.

The thin cylindrical dielectric sheet may be structurally supported either by placing a foam or 3D printed insert with relative permittivity near 1 within the cylinder's radius or by placing a ring around the cylinder over the microstrip ground plane. This conformal circular array of planar dipoles may be scaled to operate at any frequency of interest. Additionally, the array may be designed using an any number of radiating/ground elements or array radius.

In an embodiment, a method for the fabrication of a phased circular array of antennas includes printing a plurality of antennas on a first side of a planar two-sided substrate sheet; printing a plurality of coplanar waveguides on the first side of the planar two-sided substrate sheet, each coplanar waveguide of the plurality having a ground line and a signal line and feeding one of the plurality of the antennas; printing a signal-carrying feed network including a coupling structure to electromagnetically couple each signal line of the plurality of coplanar waveguides on a second side of the planar two-sided substrate sheet, wherein the second side of the planar two-sided substrate sheet opposite the plurality of antennas on the first side is devoid of an electrical conductor; printing an electrical ground on the first side of the planar two-sided substrate sheet connected to the ground line of each of the plurality of coplanar waveguides which serves as a ground plane for the signal-carrying feed network; and conforming the planar two-sided substrate sheet to the shape of a cylinder having the first side of the planar two-sided substrate sheet on the outside of the cylinder. Printing can be accomplished by techniques known in the art for depositing metals on a substrate, including but not limited to chemical deposition, such as chemical vapor deposition.

This design is unlike previously designed beam steered circular arrays due to its construction and method used to steer the beam. Disclosed is a conformal array printed on a thin dielectric sheet. Once the array and feed system are etched onto the dielectric sheet, the planar array may be wrapped into a cylinder to form the desired circular shape. This process greatly simplifies the fabrication and assembly of the circular array. Since the feed system may be printed on the same substrate as the array, external beamforming networks, beam switching networks, and butler matrices are not required. Without the external beam steering circuitry, the size of this array is reduced which is critically important for incorporating this design into an automotive system. The method used to steer the beam in the azimuth plane is also advantageous over the prior technologies. In the prior technologies, only a subset of elements could be powered to steer the beam. All elements in this disclosure are powered and the beam is steered by adjusting the phase excitation of each element. Since all elements contribute to the radiated field, fewer elements are required to achieve the desired beam characteristics. With fewer required radiating elements, the size of the array can be further reduced.

The disclosed design is a conformal array using planar circuitry and to surround the CPW feed lines with dipole elements. Printing the design on a planar dielectric sheet and then wrapping the circuit into the cylindrical shape ensures the design is simple to fabricate. The electric field polarization of the feed system is aligned with the antenna elements by using CPW to feed the planar center-fed dipole antennas. Surrounding the CPW with the planar dipoles helps minimize any distortion in the omnidirectional radiation pattern caused by the CPW. In this configuration, all radiating elements are excited with equal magnitude so the beam may be steered towards any arbitrary direction in the plane by adjusting only the phase excitation.

The most notable features include the dual dipole radiating elements and its construction as a conformal array. Printing the array on a planar dielectric and then wrapping the dielectric sheet to form the cylindrical array greatly simplifies the fabrication and assembly of the circular array. Additionally, the radiating elements are designed using two planar center-fed dipole elements fed by CPW. These radiating elements have a nearly omnidirectional radiation pattern which enables the 360° beam steering.

The design can be modified depending on the application and desired beam characteristics. The operating frequency of the array in the example is 2.45 GHz, but the operating frequency and array radius application of this array could be modified depending on the application and desired beam characteristics. To operate at a frequency other than 2.45 GHz, the dimension of the dipole is recalculated with respect to the corresponding wavelength using wavelength scaling given in FIG. 9 to be $0.2262\lambda$. The remaining dimensions in FIG. 9 excluding the CPW can be used to tune the device's performance. The number of elements in the array could also be adjusted to meet the gain requirements of the intended application. The example demonstrates beam steering using a passive microstrip corporate feed system. This passive phasing could be replaced by electronic phase shifters to dynamically steer the array's beam. The beam can be steered towards a desired direction using eq. (1) to calculate the relative phase difference between the radiating elements for active or passive phase shifting techniques.

Features of the present disclosure are disclosed in C. Devitt and J. Venkataraman, "Beam Steering Circular Arrays in Elevation and Azimuth Planes for Automotive Radar Applications," 2021 IEEE International Symposium on Antennas and Propagation and USNC-URSI Radio Science Meeting (APS/URSI), 2021, pp. 995-996, doi: 10.1109/APS/URSI47566.2021.9704145, which is hereby incorporated by reference in its entirety.

Figure 4:
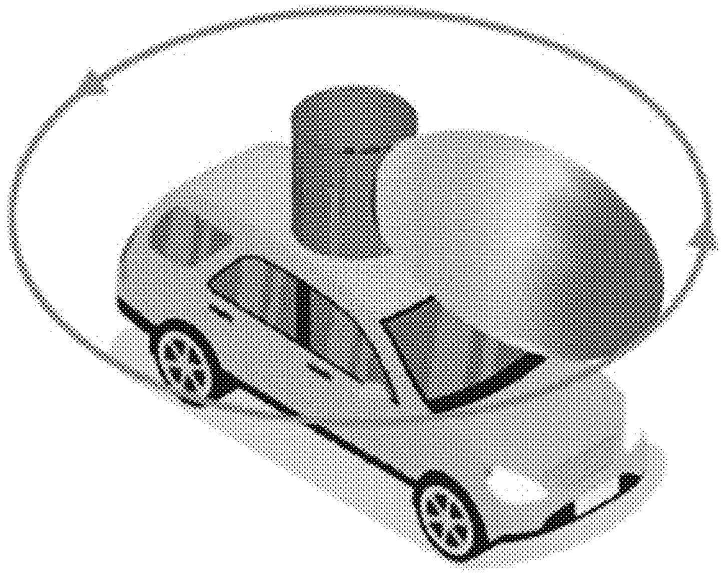
FIG. 4 is an isometric top-down illustration of 360° beam steering around a vehicle.

This conformal array may be used in an adaptive beam steered automotive radar system. The 360° beam steering is a unique advantage that is not possible with grid or linear arrays typically used in automotive radar. The data provided by an adaptively steered radar using this conformal array may be used to supplement or replace a LiDAR system. This array is not limited to use in automotive radar systems; it may also be incorporated into airborne vehicles. The conformal circular array may also be adopted to create millimeter-wave wireless communication links between servers in a data center. By steering the main beam, the communication links between sever racks may be changed dynamically. Such a system would eliminate the need for a physical switching fabric. With the wireless communication links, the power consumption, required maintenance, and overhead for server-to-server communication would be substantially reduced. This conformal array may be used in an adaptive beam steered automotive radar system. The 360° beam steering is a unique advantage that is not possible with grid or linear arrays typically used in automotive radar. The data provided by an adaptively steered radar using this conformal array may be used to supplement or replace a LiDAR system. FIG. 4 is an isometric top-down illustration of 360° beam steering around a vehicle.

This array is not limited to use in automotive radar systems; it may also be incorporated into airborne vehicles.

The conformal circular array may also be adopted to create millimeter-wave wireless communication links between servers in a data center. By steering the main beam, the communication links between sever racks may be changed dynamically. Such a system would eliminate the need for a physical switching fabric. With the wireless communication links, the power consumption, required maintenance, and overhead for server-to-server communication would be substantially reduced.

Figure 5:
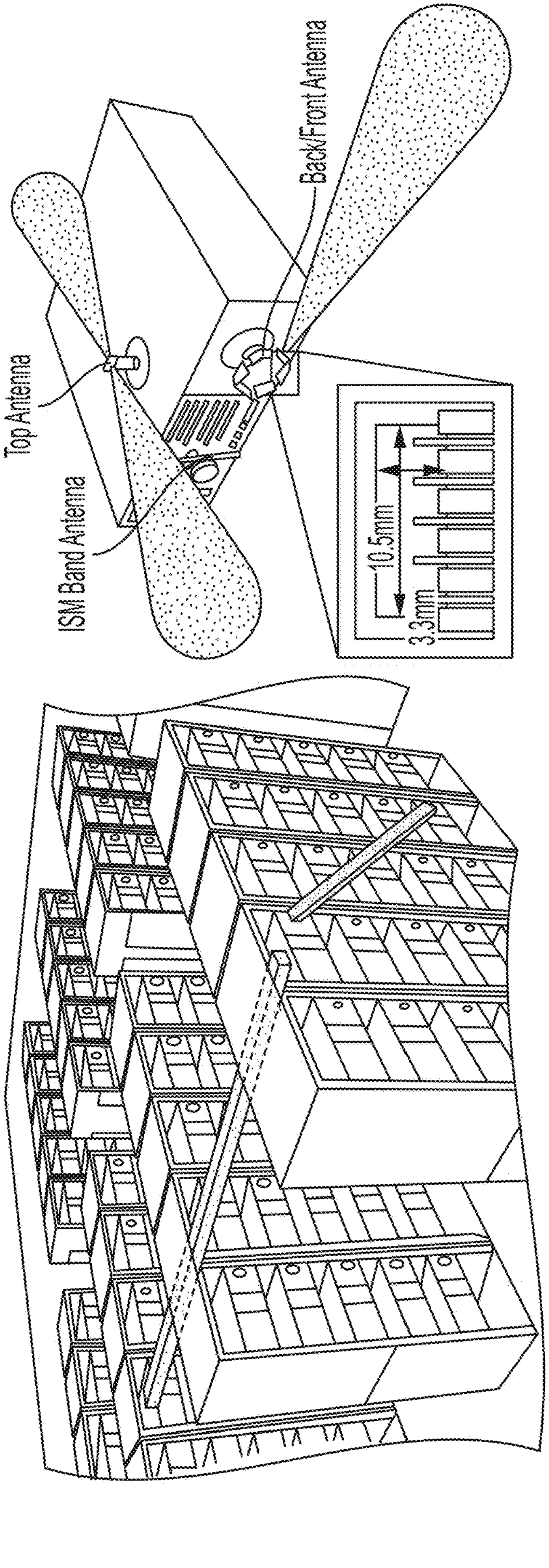
FIG. 5 illustrates beam steered circular arrays on servers to create wireless server-to-server millimeter wave communication links.

FIG. 5 illustrates beam steered circular arrays on servers to create wireless server-to-server millimeter wave communication links.

Automotive radar plays a vital role in autonomous, semi-autonomous, and advanced driver assistance systems. The radar must scan the environment surrounding the vehicle for obstacles, pedestrians, other vehicles, etc. The radar's output power must be sufficiently high to detect objects with small radar cross sections (RCS) and objects that are far away from the radar. If an object with a large RCS is close to the radar, then the power at the receive antenna array may be saturated and details regarding small objects would be lost. To combat this potential issue, a narrow transmit beam may be adaptively steered towards any direction of interest and the transmit power adjusted such that all objects surrounding the vehicle may be successfully identified. With this adaptively steered radar system, it is advantageous to be able to steer the transmit beam towards any direction around the vehicle. If such an array is developed, then the number of required radar systems to scan the environment surrounding the vehicle could be reduced. This design seeks to satisfy this need by creating an antenna array capable of 360° beam steering in the azimuth plane which is simple to fabricate and has a small form factor.

The disclosure will be further illustrated with reference to the following specific examples. It is understood that these examples are given by way of illustration and are not meant to limit the disclosure or the claims to follow.

Example 1

Figure 6:
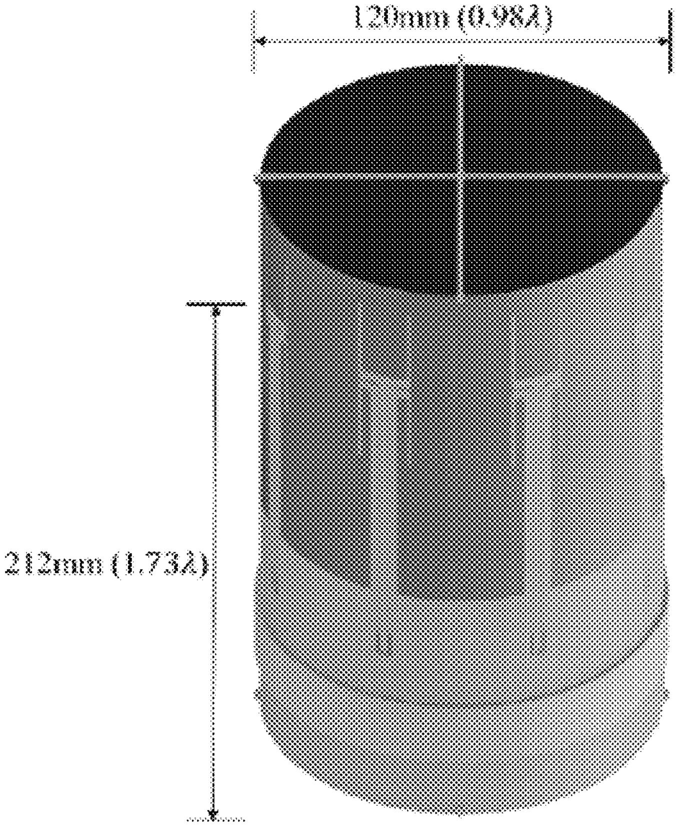
FIG. 6 shows an 8 dual-dipole conformal array of the present disclosure.

Two typical examples of this conform array have been fabricated and experimentally verified. Both prototype arrays are designed at 2.45 GHz using 8 dual-dipole elements placed in a circular array with radius 60 mm (0.49λ). The conformal array is printed on a 10 mil Rogers3003 substrate. A microstrip corporate feed system is used to apply a passive beam steering phase excitation. Each of the two prototypes are designed to steer the beam in a distinct direction so two distinct microstrip feed systems are designed to apply the necessary phase excitation. A rendering of this this prototype array is pictured in FIG. 6.

Figure 7A:
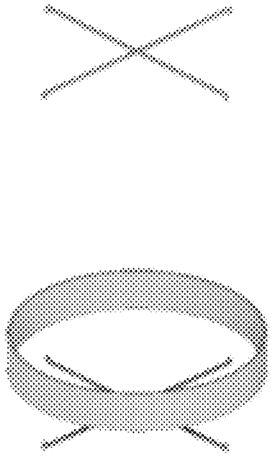
FIG. 7A shows 3D printed supports that help maintain the cylindrical array shape.
Figure 7B:
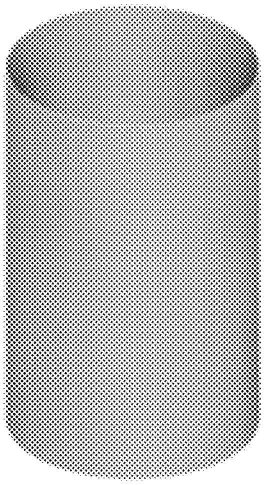
FIG. 7B shows a substrate bent into a cylinder.
Figure 7C:
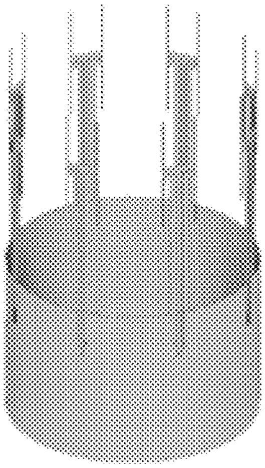
FIG. 7C shows etched copper features on the outside surface of the dielectric containing the dual-dipole elements, microstrip ground plane, and coplanar waveguide feedlines.
Figure 7D:
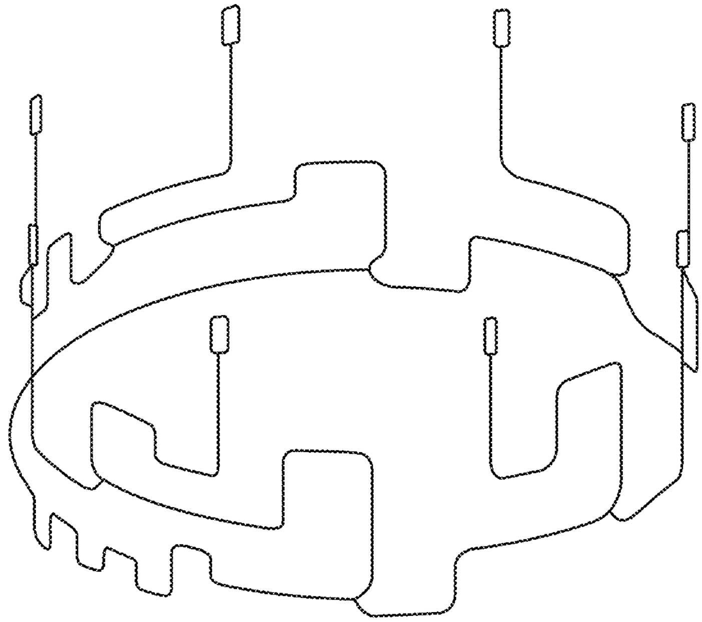
FIG. 7D shows a passive microstrip corporate feed system with the CPW to microstrip transition.

FIGS. 7A-7D show an exploded view of the prototype conformal array of 8 dual-dipole element. Each piece is described starting from FIG. 7A showing 3D printed supports that help maintain the cylindrical array shape, FIG. 7B showing a 10 mil Rogers3003 substrate bent into a cylinder, FIG. 7C showing etched copper features on the outside surface of the dielectric containing the dual-dipole elements, microstrip ground plane, and coplanar waveguide feedlines, and FIG. 7D showing passive microstrip corporate feed system with the CPW to microstrip transition.

Figure 8:
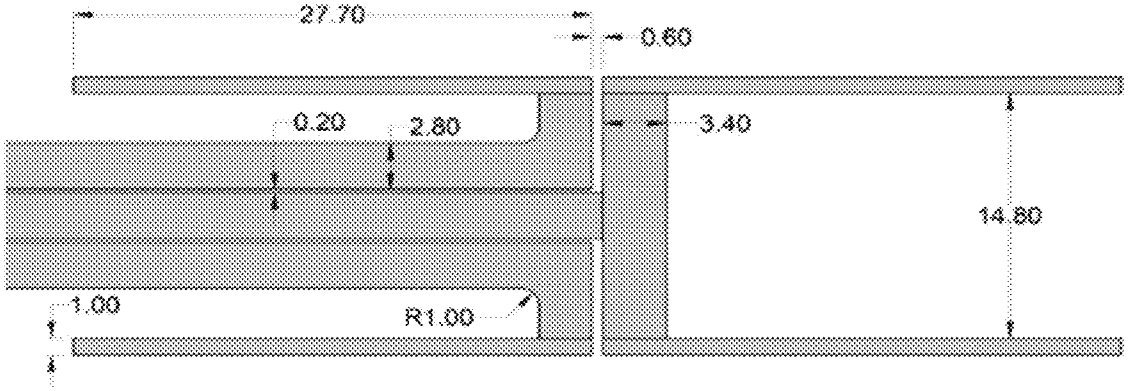
FIG. 8 shows the dimensions at 2.45 GHz in millimeters of the CPW and dual-dipole radiating element.
Figure 9:
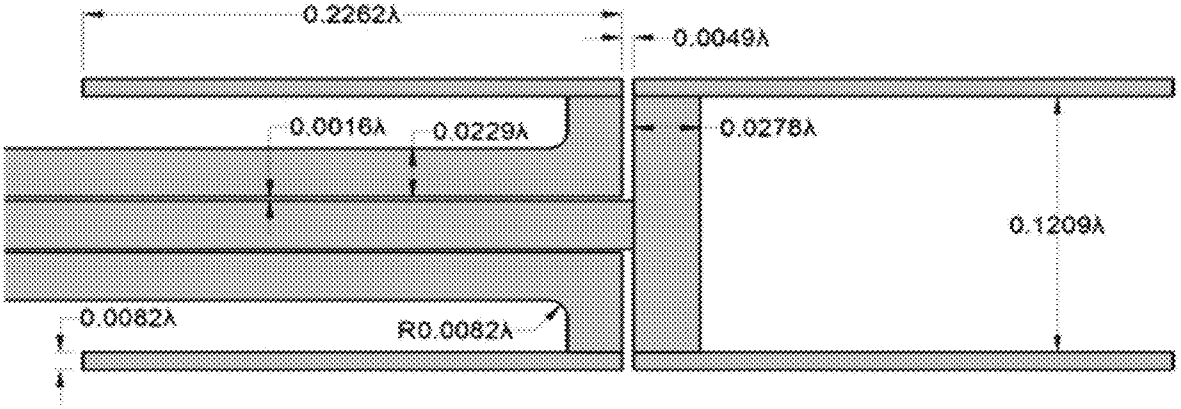
FIG. 9 shows the dimensions in wavelength of the CPW and dual-dipole radiating element.
Figure 10:
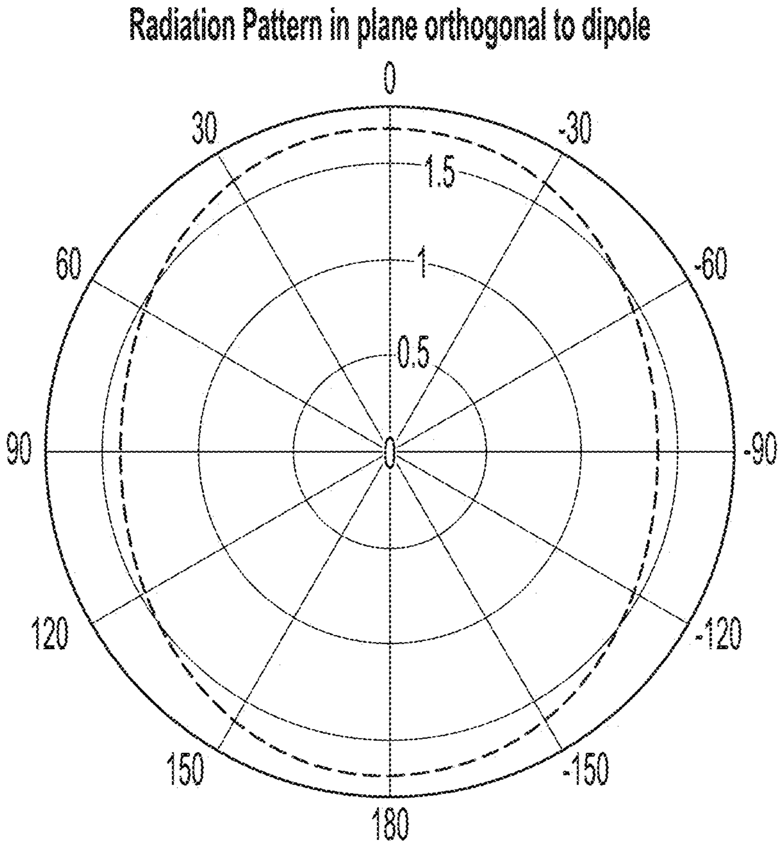
FIG. 10 shows the nearly omnidirectional simulated radiation pattern of the dual-dipole shown in FIG. 8.

FIG. 8 shows the dimensions at 2.45 GHz in millimeters of the CPW and dual-dipole radiating element for this prototype. FIG. 9 shows the dimensions of the CPW and dual-dipole radiating element for this prototype designed at 2.45 GHz in millimeters and in terms of the wavelength in free space. FIG. 10 shows the nearly omnidirectional simulated radiation pattern of the dual-dipole shown in FIG. 8.

Figure 13:
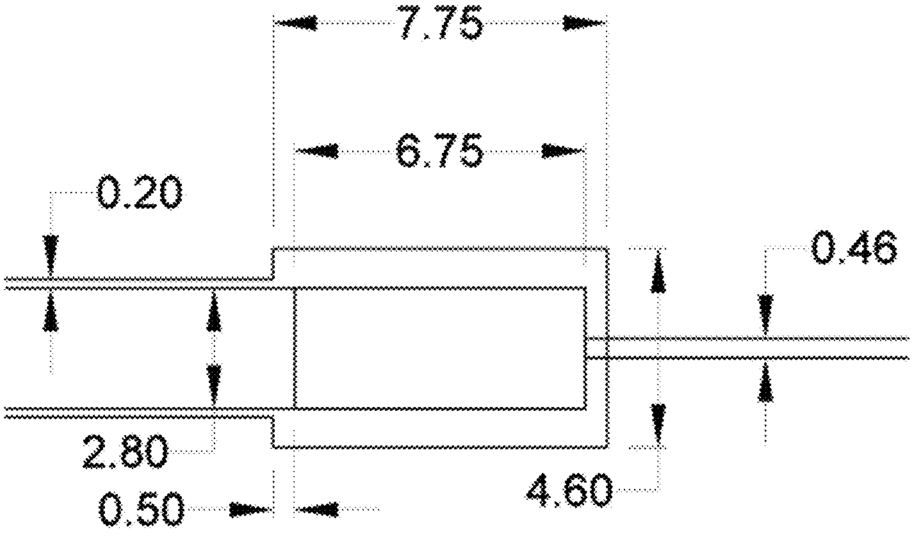
FIG. 13 shows the dimensions of the CPW to microstrip transition in millimeters at 2.45 GHz.
Figure 14:
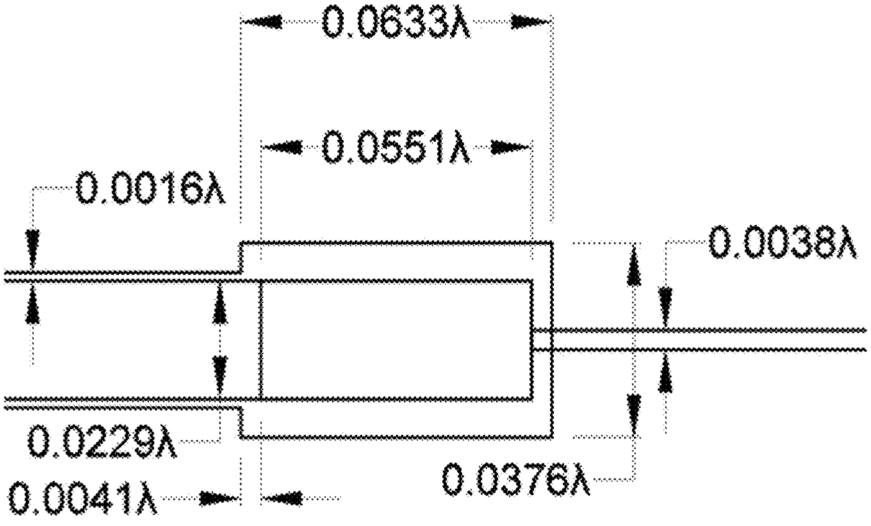
FIG. 14 shows the dimensions of the CPW to microstrip transition in terms of wavelength.

FIG. 11 shows a structure of the CPW of the outside surface copper to microstrip (MS) including coupling patch of the inside surface copper transition through the thin dielectric sheet and FIG. 12 shows a structure of the CPW of the outside surface copper including a dual-dipole radiating element to microstrip (MS) including coupling patch of the inside surface copper transition through the thin dielectric sheet. FIG. 13 shows the dimensions of the CPW to microstrip (MS) transition in millimeters at 2.45 GHz and FIG. 14 shows the dimensions of the CPW to microstrip (MS) transition in terms of the wavelength in free space.

Figure 15:
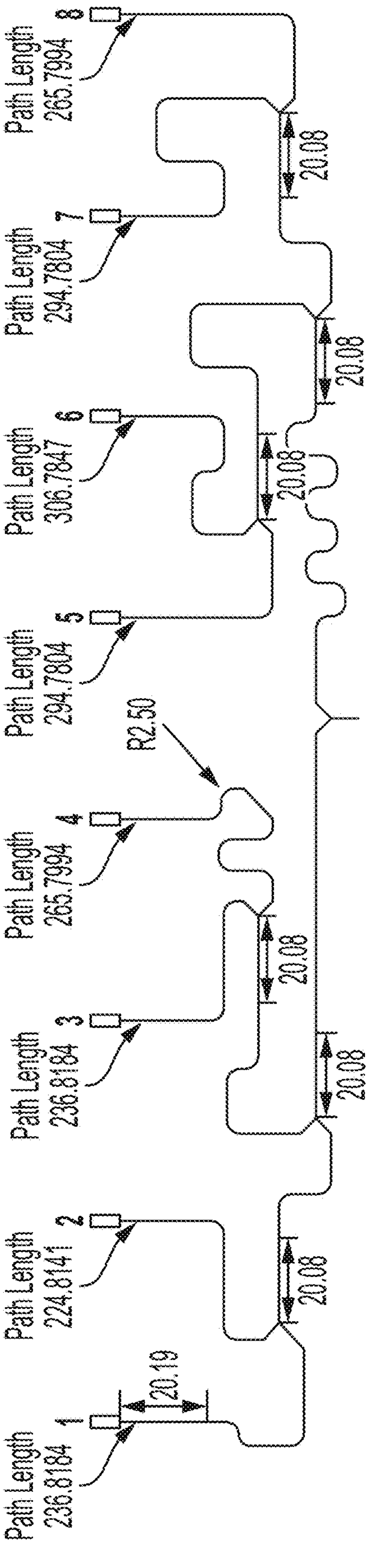
FIG. 15 shows a microstrip corporate divider designed to steer the main beam towards element 2 of Table 1 ($\phi_0$=45°) at 2.45 GHz in terms of millimeters.
Figure 16:
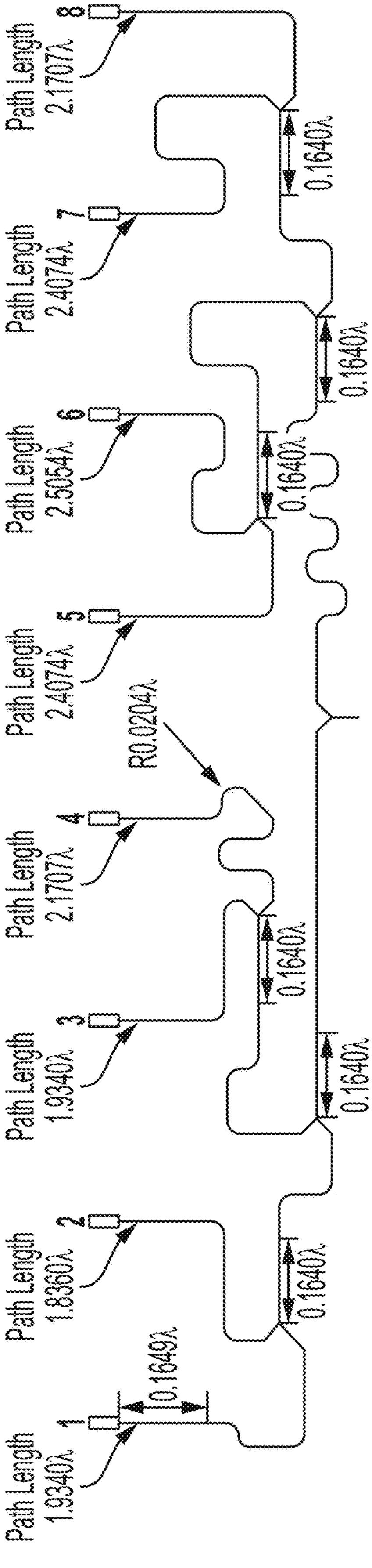
FIG. 16 shows a microstrip corporate divider designed to steer the main beam towards element 2 of Table 1 ($\phi_0$=45°) in terms of wavelengths.
Figure 17:
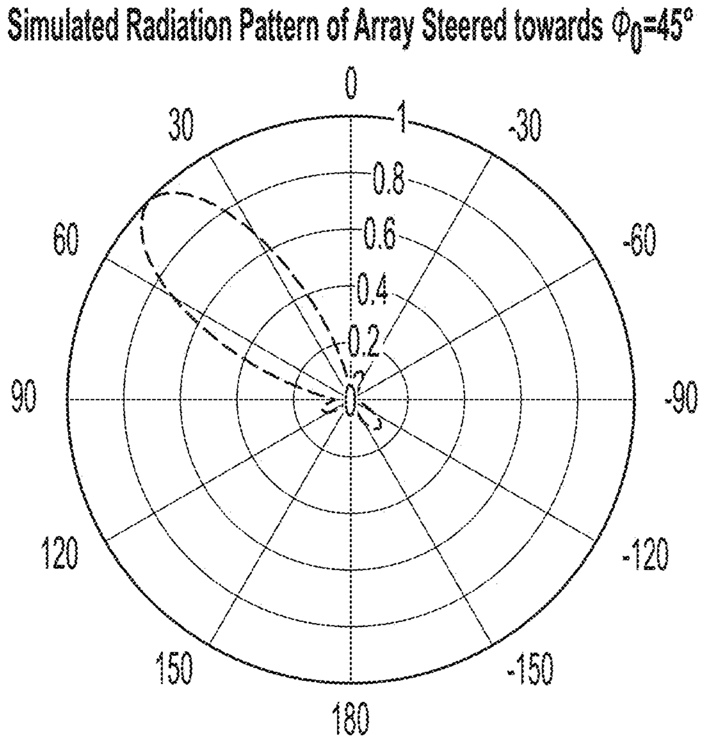
FIG. 17 shows a simulated radiation pattern of conformal array using first microstrip corporate divider.

FIG. 15 and FIG. 16 show one of two microstrip corporate dividers that applies a uniform magnitude excitation and phase excitation to steer the main beam towards element 2 ($\phi_0$=45°). FIG. 15 shows a microstrip corporate divider designed to steer the main beam towards element 2 of Table 1 ($\phi_0$=45°) at 2.45 GHz in terms of millimeters. FIG. 16 shows a microstrip corporate divider designed to steer the main beam towards element 2 of Table 1 ($\phi_0$=45°) in terms of wavelengths. The feed system is shown as designed before wrapping the array into the cylindrical shape.

TABLE 1

| Element | Simulated Sn1 Phase [deg] | Simulated Sn1 Magnitude |
|---|---|---|
| 1 | −123.9460 | 6 338 |
| 2 | −173.6385 | 0.1137 |
| 3 | 128.7772 | 0.1260 |
| 4 | 0 | 0.1538 |
| 5 | 127.5970 | 0.1183 |
| 6 | 177.0163 | 0.1220 |
| 7 | 126.7267 | 0.1133 |
| 8 | −0.8079 | 0.1047 |

Simulated magnitude and phase excitation provided by microstrip corporate feed system to steer towards $\phi_0$ = 45°.

Figure 18:
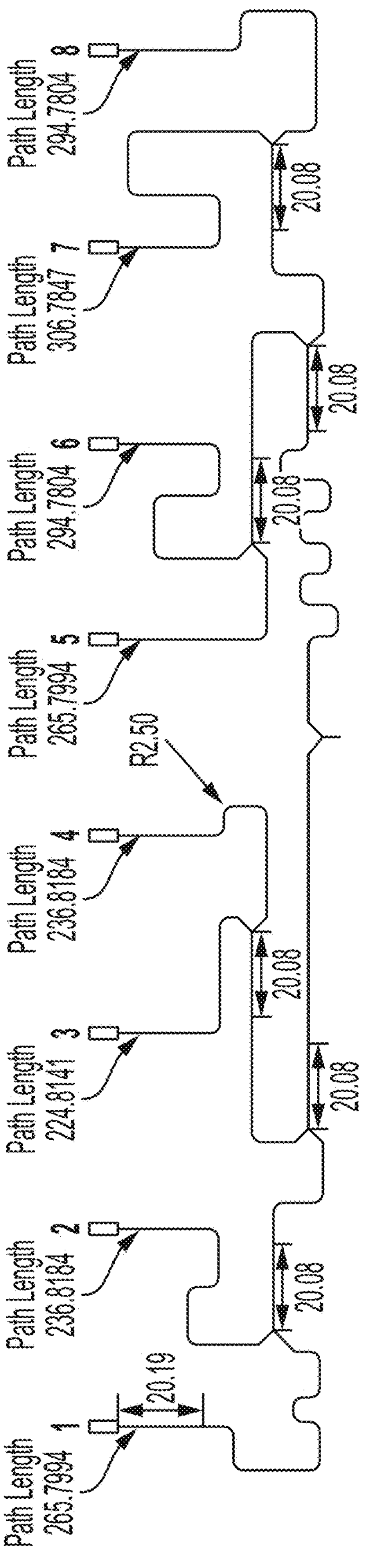
FIG. 18 shows a microstrip corporate divider designed to steer the main beam towards element 3 of Table 2 ($\phi_0$=90°) at 2.45 GHz in terms of millimeters.
Figure 19:
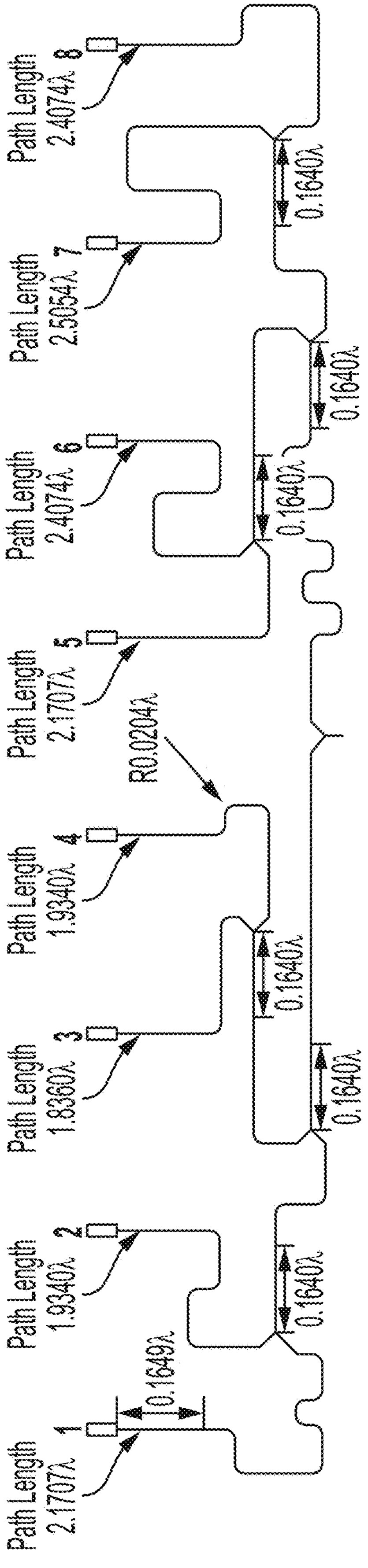
FIG. 19 shows a microstrip corporate divider designed to steer the main beam towards element 3 of Table 2 ($\phi_0$=90°) in terms of wavelengths.

FIG. 18 and FIG. 19 show the second microstrip corporate divider which applies a uniform magnitude excitation and phase excitation to steer the main beam towards element 3 ($\phi_0$=90). FIG. 18 shows a microstrip corporate divider designed to steer the main beam towards element 3 of Table 2 ($\phi_0$=90°) at 2.45 GHz in terms of millimeters. FIG. 19 shows a microstrip corporate divider designed to steer the main beam towards element 3 of Table 2 ($\phi_0$=90°) in terms of wavelengths.

Figure 20:
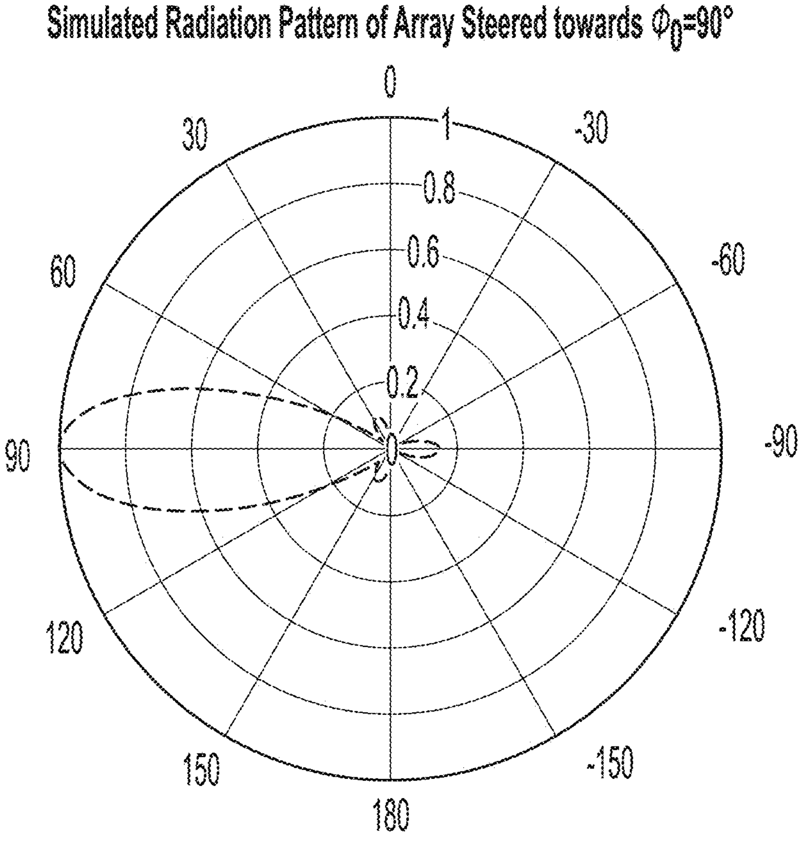
FIG. 20 illustrates a simulated radiation pattern of conformal array using the second microstrip corporate divider feed system.

Table 2 shows the simulated phase and magnitude excitation provided by this second feed system to steer the beam towards element 3. FIG. 20 illustrates the simulated radiation pattern using this passive feed system.

TABLE 2

| Element | Simulated Sn1 Phase [deg] | Simulated Sn1 Magnitude |
|---|---|---|
| 1 | −123.9460 | 0.1209 |
| 2 | −173.6385 | 0.1137 |
| 3 | −128.7772 | 0 1260 |
| 4 | 0 | 0.1538 |
| 5 | 127.5970 | 0.1183 |
| 6 | 177.0168 | 0.1220 |
| 7 | 126.7267 | 0.1133 |
| 8 | −0.8079 | 0.1047 |

Simulated magnitude and phase excitation provided by microstrip corporate feed system to steer towards $\phi 0 = 90°$.

Figure 21:
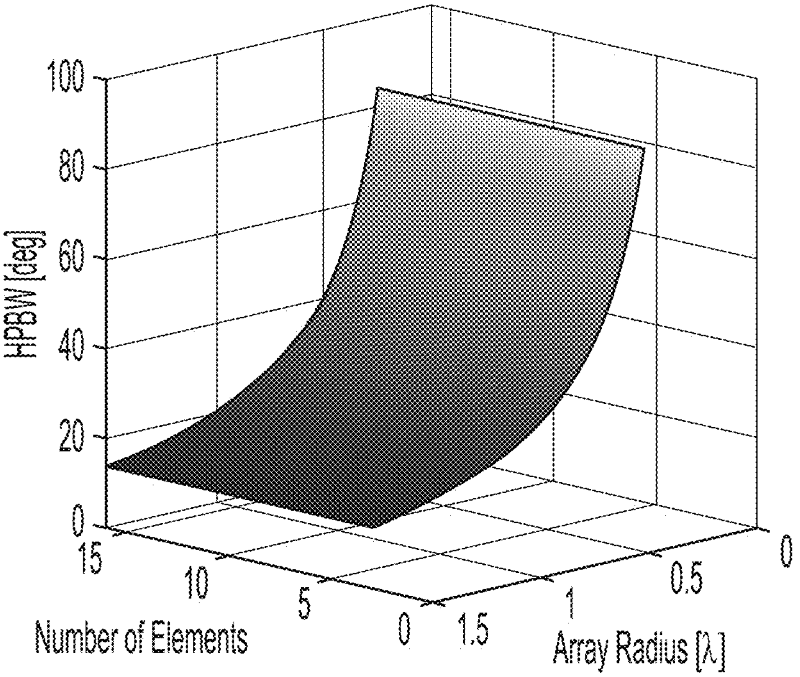
FIG. 21 shows the effect of array radius and number of elements on HPBW of a uniform circular array of isotropic elements.

The method used to determine the radius of the circular array and number of elements to optimize the half-power beam width (HPBW) and sidelobe level (SLL) is presented in this section. FIG. 21 shows the effect of the number of elements and array radius on the HPBW of a uniform circular array of isotropic elements based the array factor equation in eq. (2) where an is the phase excitation from eq. (1). The HPBW does not depend on the number of elements so the array's radius may be chosen to achieve a desired HPBW. As illustrated in the figure, the HPBW and array radius are inversely proportional.

$$AF(\theta, \phi) \sum_{n=1}^{N} \exp\left[\underline{jk}\alpha \sin\theta \cos(\phi - \phi_n) + j\alpha_n\right] \quad \text{eq. (2)}$$

Figure 22:
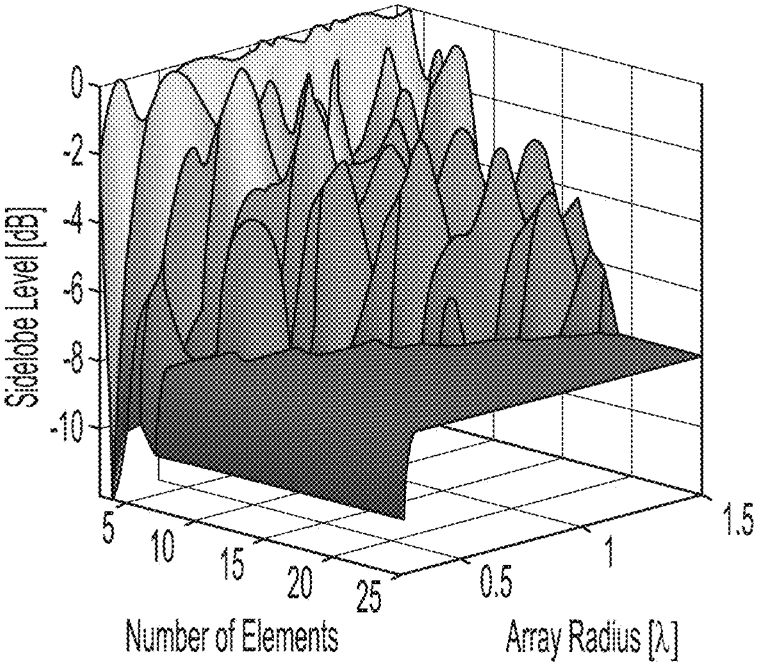
FIG. 22 shows the effect of array radius and number of elements on normalized sidelobe level of a uniform circular array of isotropic elements.

FIG. 22 shows the effect of the number of element and array radius on the SLL for a similar circular array of isotropic elements. The normalized SLL reaches a minimum value of about −8 dB after the density of elements reaches a critical threshold. For the array radius used achieve the desired HPBW, the number of elements in the array should large enough that the normalized SLL reaches this minimum value.

Figure 23:
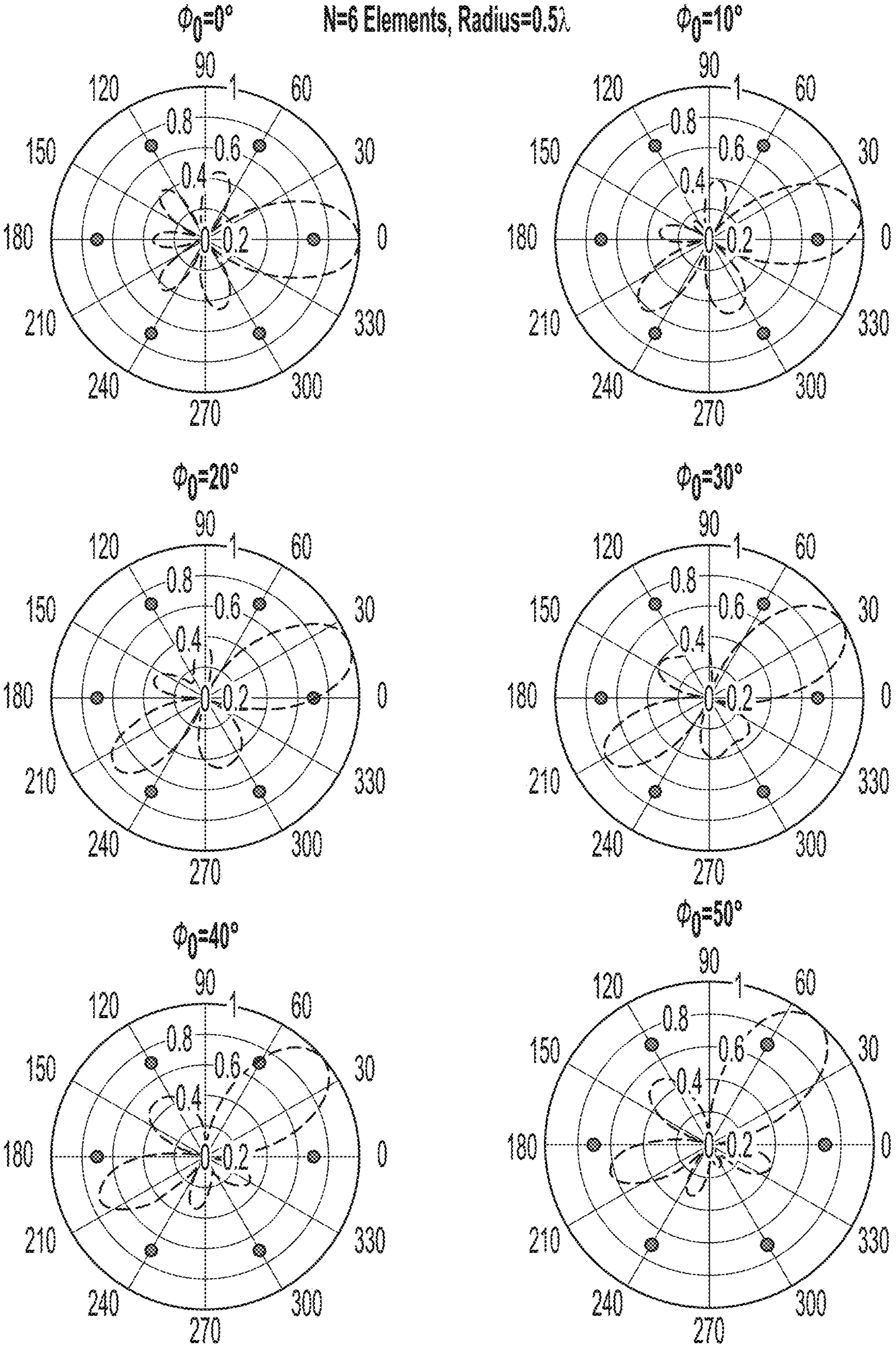
FIG. 23 shows the effect of steered direction on various radiation patterns of a 6-element array with element location shown as dots.

The following figures illustrate the radiation patterns of the circular isotropic array using eq. (2) and the red dots in each figure represent the antenna element locations. FIG. 23 illustrates how the radiation pattern changes as the direction of the main beam is steered in the azimuth plane.

Figure 24:
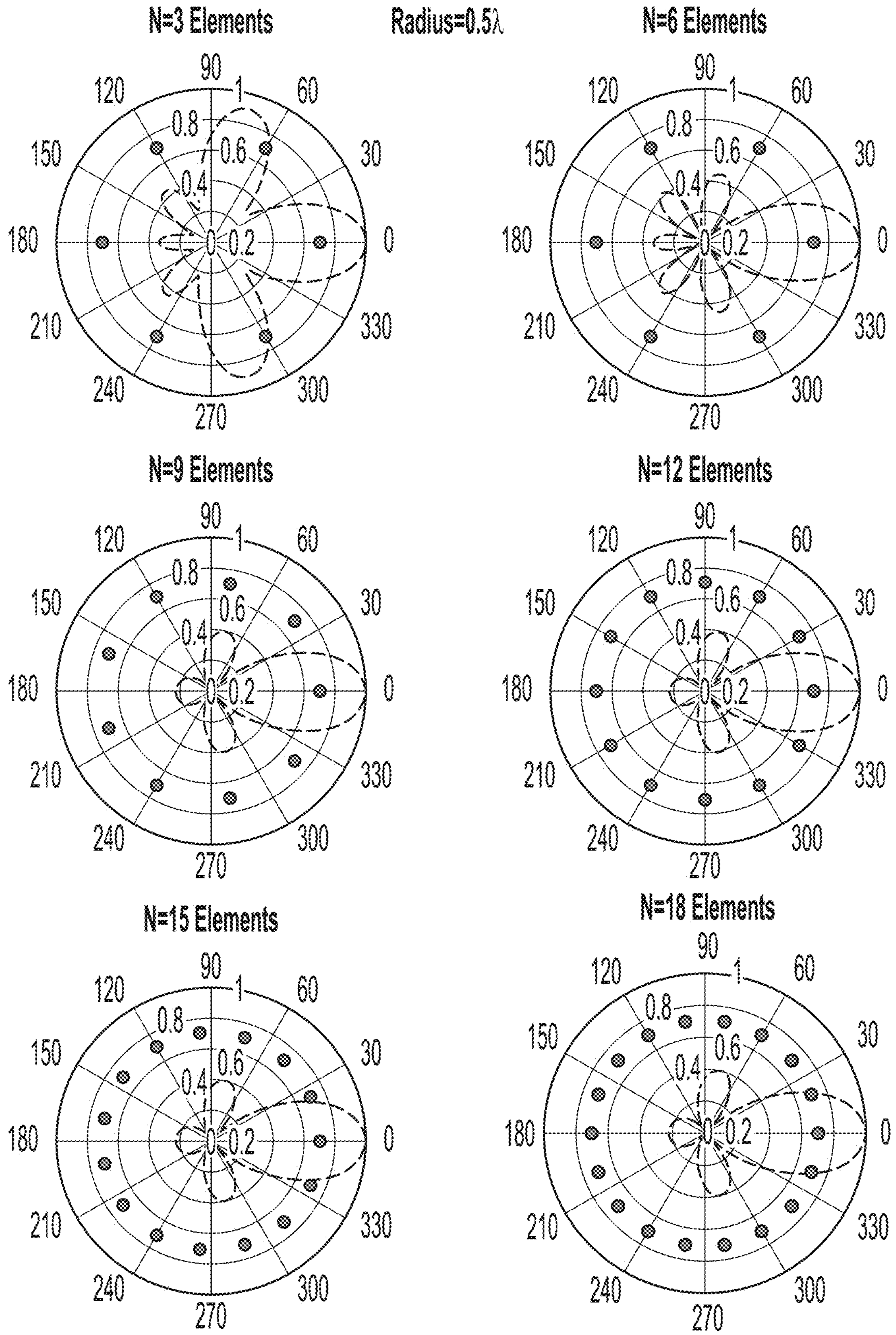
FIG. 24 illustrates the effect of the number of elements on the radiation pattern circular isotropic array steered towards ($\phi_0$=0°) with element location shown as dots.

FIG. 24 illustrates the effect of the number of elements on the radiation pattern.

Figure 25:
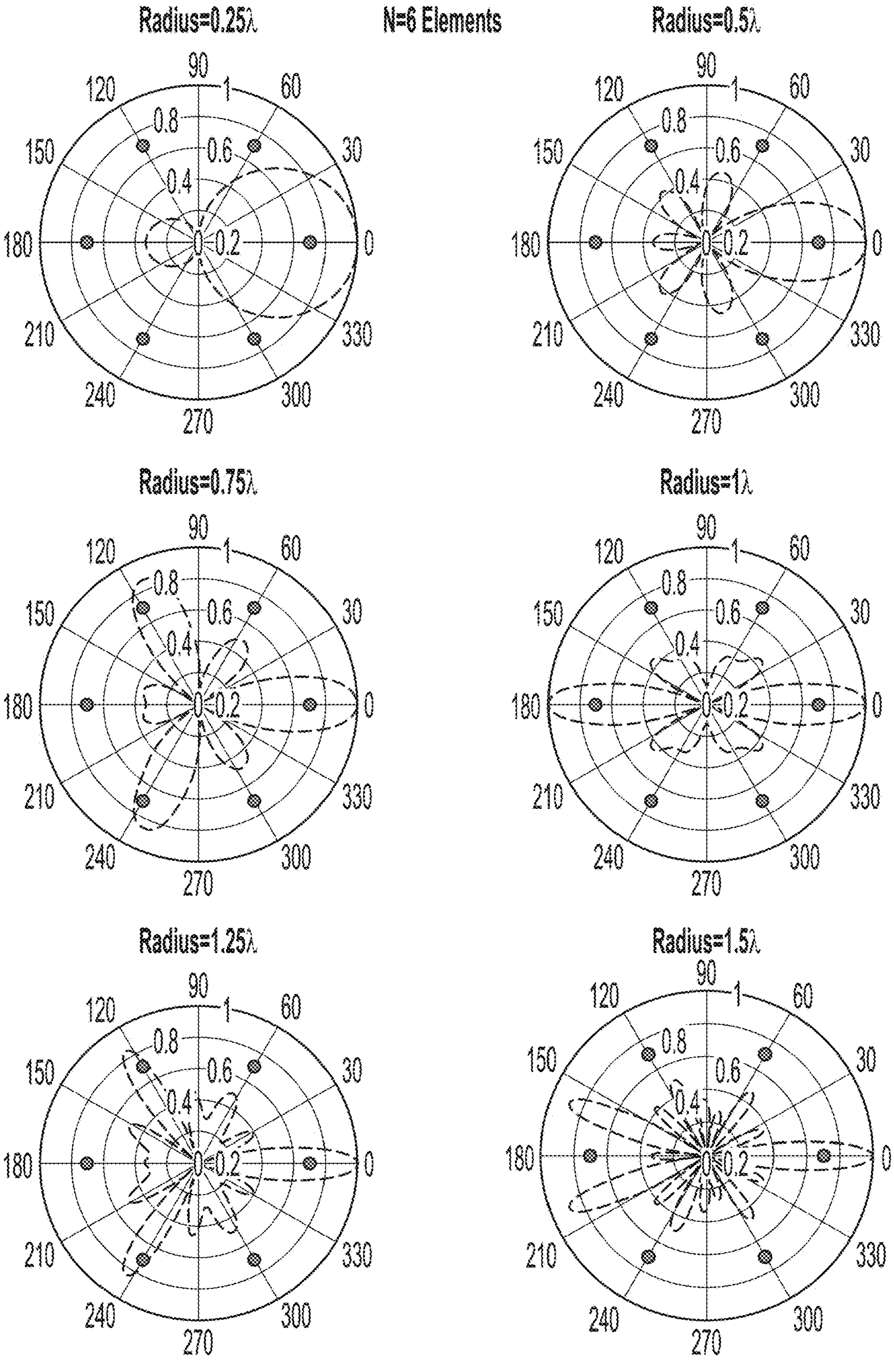
FIG. 25 shows the effect of array radius on radiation pattern of 6-element circular isotropic array steered towards ($\phi_0$=0°) with element location shown as dots.

FIG. 25 illustrates the effect of the array's radius on the radiation pattern.

Experimental Verification and Proof of Concept (POC)

Figure 26:
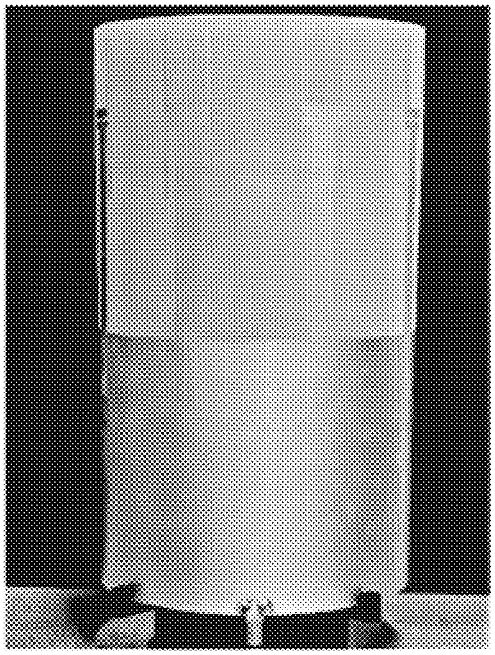
FIG. 26 is a photograph of a fabricated conformal array.

Two prototype conformal 8-element circular arrays have been fabricated each with a passive phase excitation provided by the microstrip corporate feed system to steer the main beam in two distinct directions in the azimuth plane: ($\theta_0$=90°, ($\phi_0$=45°) and ($\theta_0$=90°, $\phi_0$=90°). The two prototypes are printed on a planar 10 mil Rogers3003 substrate with two 0.5 oz silver plated copper layers. Once printed, the two arrays are wrapped around a 3D printed cylindrical mold with radius 60 mm, secured with double-sided tape, and the mold is removed. The tape along with 3D printed supports maintain the cylindrical shape. An edge mounted SMA connector is soldered to the input of the microstrip corporate feed system. A picture of one of the fabricated prototypes is given in FIG. 26.

Figure 27:
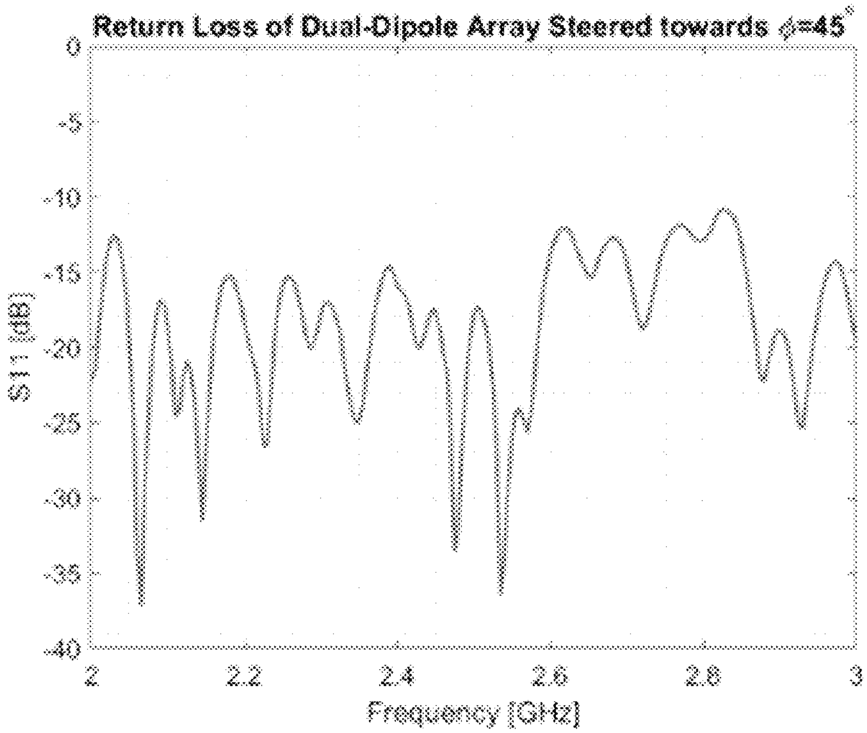
FIG. 27 shows the measured return loss of fabricated array steered towards ($\phi_0$=) 45°.
Figure 28:
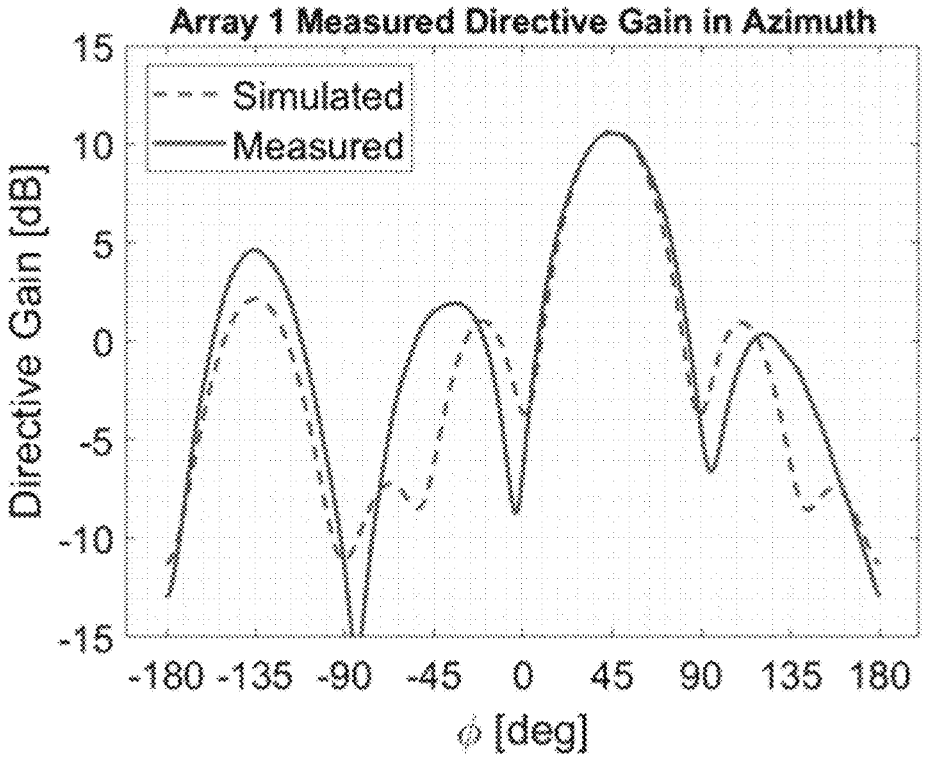
FIG. 28 shows the measured and simulated directive gain of the prototype array designed to steer the main beam towards 45° in azimuth.
Figure 29:
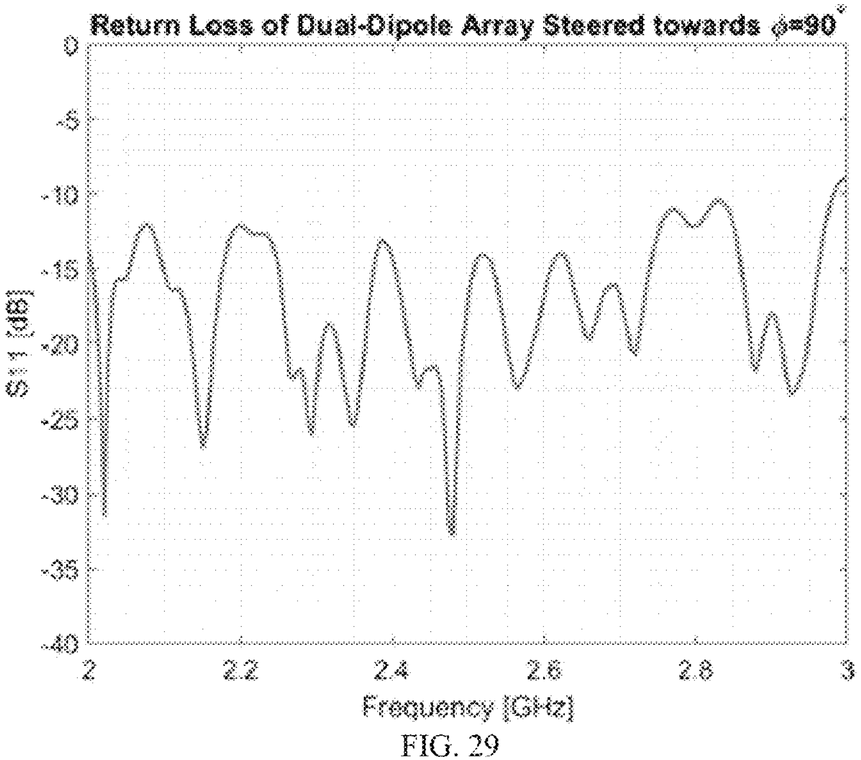
FIG. 29 shows the measured return loss of fabricated array steered towards ($\phi_0$=) 90°.
Figure 30:
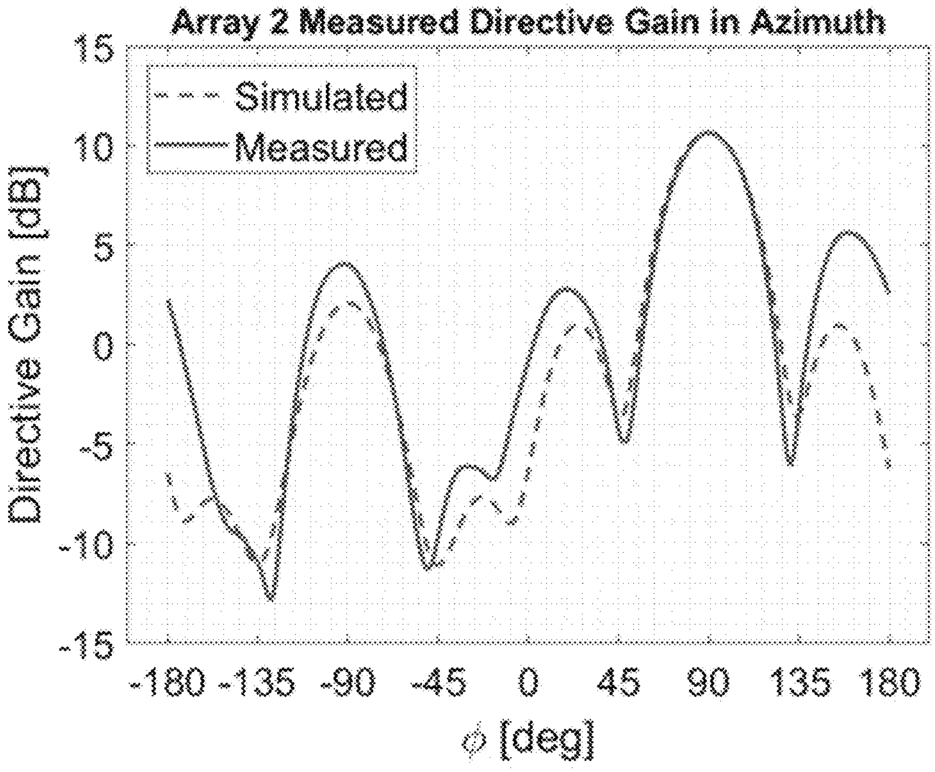
FIG. 30 shows the measured and simulated directive gain of the prototype array designed to steer the main beam towards 90° in azimuth.

The return loss and radiation pattern of the fabricated arrays were measured in the Electromagnetics laboratory at the Rochester Institute of Technology. The return loss of the fabricated prototypes was measured using a network analyzer (Copper Mountain R140) connected to the array through a short SMA cable. The radiation patterns of the arrays were measured by placing each in an S-band anechoic chamber connected to a spectrum analyzer. An RF oscillator was used to excite a standard transmit antenna placed on the opposite side of the chamber at 2.45 GHz. while a stepper motor rotated the array in 1° increments. At each step, the received power was recorded using the spectrum analyzer. The measured return loss and radiation patterns of the two fabricated prototype arrays are shown in FIGS. 27-30. FIG. 27 shows the measured return loss of the fabricated array steered towards ($\phi_0$=45°). FIG. 28 shows the measured and simulated directive gain of the prototype array designed to steer the main beam towards 45° in azimuth. The directive gain was measured in a spherical near field anechoic chamber. FIG. 29 shows the measured return loss of the fabricated array steered towards ($\phi_0$=) 90°. FIG. 30 shows the measured and simulated directive gain of the prototype array designed to steer the main beam towards 90° in azimuth. The directive gain was measured in a spherical near field anechoic chamber.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A phased circular array of antennas, comprising: a hollow cylinder; a plurality of antennas disposed on an outside surface of the cylinder, each antenna of the plurality comprising paired ground and signal radiating elements having an omnidirectional radiation pattern; a plurality of coplanar waveguides disposed on the outside surface of the cylinder, each coplanar waveguide of the plurality comprising a ground line and a signal line and feeding one of the plurality of paired ground and signal radiating elements, wherein the ground of the radiating element is connected to the coplanar waveguide ground line and the signal of the radiating element is connected to the coplanar waveguide signal line; a signal-carrying feed network disposed on an inside surface of the cylinder electromagnetically coupled to the plurality of coplanar waveguides and which does not interfere with radiation from the antennas, wherein the inside surface of the cylinder opposite the plurality of paired ground and signal radiating elements is devoid of an electrical conductor; and an electrical ground disposed on the outside surface of the cylinder connected to the ground feed of each of the plurality of coplanar waveguides which serves as a ground plane for the signal-carrying feed network.

2. The array of claim 1, wherein the paired ground and signal radiating elements comprise dual dipoles.

3. The array of claim 1, wherein the cylinder is a dielectric material.

4. The array of claim 1, wherein the signal-carrying feed network comprises a microstrip transmission line and a coupling patch configured to provide a transition from an orthogonal electric field configuration of the microstrip transmission line to the configuration of the coplanar waveguide.

5. The array of claim 1, wherein the plurality of antennas provides continuous beam steering capability in the plane of the array with 360-degree coverage.

6. A method for the fabrication of a phased circular array of antennas, comprising: printing a plurality of antennas on a first side of a planar two-sided substrate sheet; printing a plurality of coplanar waveguides on the first side of the planar two-sided substrate sheet, each coplanar waveguide of the plurality comprising a ground line and a signal line and feeding one of the plurality of the antennas; printing a signal-carrying feed network comprising a coupling structure to each signal line of the plurality of coplanar waveguides on a second side of the planar two-sided substrate sheet, wherein the second side of the planar two-sided substrate sheet opposite the plurality of antennas on the first side is devoid of an electrical conductor; printing an electrical ground on the first side of the planar two-sided substrate sheet connected to the ground line of each of the plurality of coplanar waveguides which serves as a ground plane for the signal-carrying feed network; and forming the planar two-sided substrate sheet to the shape of a hollow cylinder having the first side of the planar two-sided substrate sheet on the outside of the cylinder.

7. The method of claim 6, wherein each antenna comprises dual dipoles, each dipole having paired ground and signal radiating elements.

8. The method of claim 6, wherein the substrate is a dielectric material.

* * * * *